US006950646B2

(12) United States Patent
Pradhan et al.

(10) Patent No.: US 6,950,646 B2
(45) Date of Patent: Sep. 27, 2005

(54) INFORMATION ACQUISITION DECISION MAKING BY DEVICES IN A WIRELESS NETWORK

(75) Inventors: Salil Pradhan, Santa Clara, CA (US); James Thomas Edward McDonnell, Bristol (GB); John Deryk Waters, Bath (GB); Peter J. Macer, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 528 days.

(21) Appl. No.: 09/843,646

(22) Filed: Apr. 27, 2001

(65) Prior Publication Data

US 2002/0160758 A1 Oct. 31, 2002

(51) Int. Cl.⁷ ................................................. H04L 9/00
(52) U.S. Cl. ....................... 455/406; 455/422; 455/426; 455/432; 455/456
(58) Field of Search ................................. 455/422, 412, 455/413, 414, 421, 456; 379/72, 76, 38.22, 114.1, 114.11, 114.13

(56) References Cited

U.S. PATENT DOCUMENTS 5,371,807 A    12/1994  Register et al. ............. 382/159
6,029,195 A     2/2000  Herz ........................... 725/116
6,091,956 A     7/2000  Hollenberg ............... 455/456.5
6,535,132 B2    3/2003  Waters et al. ............. 340/573.1
6,549,625 B1 *  4/2003  Rautila et al. ............... 380/258
6,650,871 B1 * 11/2003  Cannon et al. ............ 455/41.2
6,757,262 B1 *  6/2004  Weisshaar et al. .......... 370/310
2002/0028674 A1 * 3/2002  Slettengren et al.
2002/0077896 A1 * 6/2002  Liu et al.

FOREIGN PATENT DOCUMENTS

| GB | 2 352 588 | 1/2001 |
| WO | 97/17774 | 5/1997 |
| WO | 97/41654 | 11/1997 |
| WO | 99/01018 | 1/1999 |
| WO | 99/59283 | 11/1999 |
| WO | 01/24551 | 4/2001 |

* cited by examiner

Primary Examiner—Allan Hoosain

(57) ABSTRACT

A mobile telephone (10), an advertiser, broadcasts an advertisement over a wireless short range piconet link to another mobile telephone (12), a consumer. The advertisement is broadcast with a predetermined set of classification tags and the consumer phone (12) has a filter set to accept only certain advertisements. When an advertisement of interest is received by the consumer phone (12) it assesses whether to obtain further details via the piconet link and the advertiser phone (10) provides then automatically via the piconet link. When the consumer wishes to reply to the advertisement they contact the advertiser phone (10), or an advertiser device, via a long range cellular link (16).

23 Claims, 7 Drawing Sheets

```
DOG FOR SALE.   DALMATION.   2 MONTHS OLD.

PRICE:  $50                                           152

LOCATION:  CHICAGO  - BUYER COLLECTS      150

WILLING TO SWAP FOR CHILDREN'S TOYS
```

| ANIMAL  | DOG    | <$100 | ILLINOIS | CHICAGO  |
|---------|--------|-------|----------|----------|
| SELL    | BUY    | SWAP  | TOY      | CHILDREN |
| PRIVATE | COLLECT|       |          |          |

154

INFORMATION ACQUISITION DECISION MAKING BY DEVICES IN A WIRELESS NETWORK

This invention relates to information acquisition by devices in a wireless network. It especially, but not exclusively, relates to advertising over a wireless network, and is especially useful in short range networks, such as Bluetooth™.

There has long been a desire to advertise goods or information on networks, usually to be exchanged for money. Spam e-mails are a fact of life, as are television advertisements and radio advertisements. Advertisements on video screens in buildings, whilst waiting in queues, and even in washrooms are known. There is so much advertising it is losing its effect on people, and people can switch off their interest as soon as they realise they are receiving an advertisement, and not pay any attention to it. This directs advertisers to use short advertisements. On the other hand, someone who is actually considering a purchase, the very person an advertiser would like to contact, may want more information to assist them.

Another problem with advertising to a mass market is that the supply of goods, or special deals, may have been exhausted by the time that a recipient of the advertisement replies to the advertisement. This can be annoying to the prospective customer. Furthermore, the usefulness of a special deal may be somewhat limited to certain customers (e.g. cheap flights from Chicago to New York may not be interesting to some one who lives in Los Angeles).

A further form of advertising is unsolicited cold-calling at a persons house, e.g. at the doorstep, or unsolicited telephone calls to try to persuade a person to buy something. This can be quite disturbing to the recipient of these personal unsolicited approaches.

There are, of course, many other forms of advertising.

It is an aim of at least one embodiment of the invention to at least try to ameliorate at least one of the aforesaid problems.

According to one aspect the invention comprises a method of advertising comprising communicating a first part of an advertisement from an advertiser telecommunications device to a consumer telecommunications device via wireless short range telecommunications and the consumer device requesting a fuller advertisement or further details from an advertisement follow-up device.

The method may comprise using long range wireless telecommunications to communicate the request for further details from the consumer device to the advertisement follow up device. This may be especially advantageous in the situation where there is relative movement between the advertiser device and the consumer device, where they may have moved out of piconet range by the time a reply to an initial advertisement is made by a consumer device, or by the time that further details for an advertisement are requested and/or transmitted. The fuller advertisement or the further details may be provided to the consumer device via short or long range wireless telecommunications.

The advertisement follow-up device may be a different device to the advertiser device or it could be the same device. The first part of the advertisement may include the telecommunications address of the advertisement follow up device.

The method may include the step of contacting an advertisement concluder device, which may be the advertisement device or the advertisement follow-up device, to accept what is being offered in the advertisement.

This contact may be over a long range telecommunications network, or over a short range piconet.

The wireless communication between the consumer device and the advertisement follow-up device, which may be the advertiser device, (indeed will often be the same device as the advertiser device) preferably takes place within about a second of the consumer device receiving the first part of the advertisement. Contact with the advertisement concluder device could be hours, days or later (or could be very soon after the contact with the follow up device). This contact may be made advantageously over long range telecommunications since the advertiser device and consumer device may have moved apart since the initial advertisement was broadcast by the advertiser device.

The request for the fuller advertisement may be made following user interaction (e.g. a user may have to press a button or select an advertisement for follow up) or the request for the fuller advertisement may be made without user intervention: it may be made automatically. For example the consumer device may have an advertisement filter and may filter incoming advertisements and only request fuller details, or further details, of advertisements that pass a screening selection. It may request such fuller or further details automatically.

According to another aspect the invention comprises a method of advertising to a consumer device comprising broadcasting a short range short-form advertisement to the device; making an assessment as to whether a reply to the advertisement is required, and if so replying to the advertisement via long range telecommunications.

The method may comprise trying to request further or fuller details of the advertisement via short range telecommunications, or via long range telecommunications. The method may comprise trying to request further or fuller details of the advertisement via short range telecommunications and failing to make contact with an advertising device, and then trying to make contact with the advertising device via the long range telecommunications.

Receipt of the short form advertisement may prompt the consumer device to request more information via the short range telecommunications, possibly automatically, possibly automatically if the short form advertisement triggers a trigger to do so.

The method may comprise short range telecommunications being used to communicate the advertisement to the consumer device, and to communicate a request for a fuller advertisement from the consumer device to an advertiser device, and to communicate fuller details from the advertiser device to the consumer device, all possibly taking place within the order of a second or a few seconds, and using long range telecommunications to carry a reply to the advertisement, preferably to an advertisement reply device, which is preferably a different device to that from which the advertisement was broadcast.

It is possible to reply to the short range transmitted advertisement via devices other than the consumer portable telecommunications device. For example a user may receive the advertisement via a piconet, but reply to it via a land line telephone system, such as a public telephone system.

The telecommunications address with which the consumer device is to communicate in any of the previous methods may be stored in the consumer device for display and/or they may be stored for automatic dial or for semi-automatic dialling (e.g. a user pressing an "accept" button, without actually knowing the number being dialled or address contacted).

Replying to an advertisement via long range telecommunications avoids problems of two piconet-connected devices moving out of range after an advertisement has been transmitted and received, but before the user wishes to make a user-initiated reply. It improves the percentage of time that a connection can be made for a reply. Furthermore, since a reply to an advertisement may typically have less data content in it than in the advertisement itself, especially if the advertisement uses pictures or video, or even sound, it does not matter so much if the advertisement reply route is more expensive to use than the advertisement-to-consumer device route (and piconet connection is typically free, whereas cellular telephone connection is often not free).

According to another aspect the invention comprises a mobile telephone or other portable telecommunications device capable of performing the role of an advertiser device or a consumer device in any of the previous methods.

The device may be capable of performing both the role of an advertiser device and of a consumer device.

The portable telecommunications device preferably comprises a short range piconet receiver and an advertisement filter, the receiver being capable of receiving piconet advertisements and the filter being, in use, capable of comparing a characterisation profile associated with a received advertisement with an allowable advertisement characteristics profile of the filter and to determine whether there is a match to an acceptable level, and to accept those advertisements which match the filter or which are not screened out by the filter.

The filter may be adapted to screen an advertisement positively into being accepted, or to screen an advertisement out so that it is definitely rejected.

The filter may be user-configurable, possibly by connecting the device, via telecommunications, to a filter protocol setting device.

The device may have a long range, e.g. cellular, telecommunications antenna or link.

The device preferably has a display screen adapted to display the advertisement. The device preferably has a piconet emitter and is preferably configured so as to emit automatically via its piconet emitter a request for more information about an advertisement upon an advertisement being accepted by the filter.

The device may have a memory and a control processor. The memory may be arranged to store telecommunications addresses for advertisements that have been accepted by the filter. The device may be arranged to attempt to contact an advertiser device automatically via its piconet telecommunications facility upon determining that a received advertisement is accepted by the filter. The device have an advertisement store and may be adapted to store in the advertisement store further information or a fuller advertisement that it receives associated with the successful receipt and acceptance by its filter of an initial advertisement. The advertisement store may include an advertisement reply address store adapted to receive a telecommunications address for replying to the advertisement.

The device may have a semi automatic advertisement reply facility such that a user activated advertisement reply control, when activated by a user, causes the device to retrieve the advertisement reply address and communicate with the advertisement reply address, preferably via long telecommunications.

According to another aspect the invention comprises a mobile telecommunications device having a memory, a receiver, an emitter, and a controller, the controller controlling the device in use to assess messages received by the receiver for a reply telecommunications address and to store any such reply address in the memory, and the device also having a reply trigger adapted in use to cause the controller to use an address from the memory send a reply to a received message to the address associated with the relevant incoming message.

The reply trigger may comprise a user operable control, such as a button. The reply trigger may comprise the output of a comparator adapted to compare characteristics of the message with a predetermined set of screening characteristics and to cause a reply to be transmitted if predetermined conditions are met.

The reply device preferably has both piconet and long range telecommunications emitters and receivers and the controller is preferably adapted, in use, to assess the telecommunications address to determine whether the reply address is a short range piconet address or a long range telecommunications address and to cause the reply to be emitted by the appropriate long or short range emitter of the device.

The controller of the device may be adapted to assess a received message to determine whether the message is of a category of interest, and if so to request further details or a fuller message via its piconet channel; and/or the device may be adapted to receive requested further details of a fuller message via its piconet channel; and/or the device may be adapted to contact a reply address via its long distance telecommunications channel.

According to another aspect the invention comprises a mobile telephone or other mobile telecommunications device having both a long range telecommunications transmitter and receiver, and a piconet telecommunications transmitter and receiver, a control processor, and a memory storage medium; wherein the memory storage medium contains an advertisement to be transmitted via the piconet transmitter, said advertisement having associated with it a number of advertisement classification codes identifying one or more characteristics of the advertisement, the control processor being adapted to broadcast the advertisement over the piconet transmitter and being adapted to monitor piconet signals that are received by the piconet receiver for a reply.

The control processor is preferably adapted to recognise a piconet received request for further information or a fuller advertisement and to cause such further information or fuller advertisement to be emitted automatically upon receipt of a request for it.

The control processor may be adapted to provide a reply telecommunications address in the advertisement or further details or fuller advertisement. That telecommunications address may be a long range, non-piconet, reply address or it may be a piconet reply address, or both a long range reply address and a piconet reply address could be given.

The device may be adapted to receive advertisement replies either via its piconet receiver or its long range receiver.

According to another aspect the invention comprises an advertisement protocol management server having an input connectable to remote telecommunication devices, and an output connectable to remote telecommunications devices, and a control processor; and wherein said control processor has access to an allowable controlled and restricted set of allowed advertisement categories and is capable of (i) operating on an input advertisement input to the server via said input to produce an output advertisement which has associated with it an appropriately selected subset of allowed advertisement categories, and to output said output advertisement via said output; or (ii) communicating with a remote telecommunications device via said output to allow said remote telecommunications device to construct an advertisement filter, either on the remote device or on the server, the filter comprising a selected subset of said allowable advertisement categories, and the selected processor being capable of passing the filter to the remote device; or (iii) performing both task (i) and task (ii).

The server may have a data base of allowable advertisement categories in it, or it may be in communication with such a database.

The server may have an advertisement screening function which is adapted to take free text or free voice advertisements, possibly originating from a remote telecommunications device, and recognise certain words and correlate the free form words with an allocated at least one constrained allowable category, and to send the allowable categories to a remote telecommunications device. The server may be adapted to add the allowable categories to the advertisement it receives and send the free-form advertisement plus constrained advertisement categories to a remote telecommunications device. The server may be adapted to re-write the free-form text of an advertisement. The server may be adapted to re-write the free-form text of an advertisement submitted to it in a constrained form, using only allowable words, and to send the constrained form advertisement to a remote telecommunications device.

The server may be adapted to act as an advertisement broker device adapted to receive one of (i) an advertisement or (ii) a reply to an advertisement and to forward the received (i) or (ii) to a remote telecommunications device; the server being adapted to modify the received (i) or (ii) so as to ensure no telecommunications address is passed with the (i) or (ii) that is transmitted by the server.

The server may be adapted to store the direct telecommunications address of the provider of the (i) or (ii) and to recall that address and forward it to a remote telecommunications device if a release signal has been received by the server. The release signal may be transmitted to the server via its input.

According to another aspect the invention comprises a network having an advertiser mobile telecommunications device and a consumer telecommunications device, the devices comprising a device in accordance with any previous device aspect of the invention, or devices capable of operating in accordance with any previous method aspect of the invention.

The network may comprise: an advertiser device comprising a hybrid mobile telephone, or other telecommunications device, having both a short range, e.g. piconet, transmitter and receiver, and also a long range telecommunications transmitter and receiver, a memory, and a control processor; the memory containing an advertisement which comprises at least an advertisement category profile containing a subset of possibly allowable advertisement categories;
a consumer device comprising a hybrid mobile telephone, or other telecommunications device, having both a short range, e.g. piconet, transmitter and receiver, and also a long range telecommunications transmitter and receiver, a memory and a control processor, the memory or the processor having an advertisement filter which, in use, compares an advertisement category profile with a filter profile of a subset of allowable advertisement categories, or specifically rejected advertisement categories, and determines whether an advertisement received by the consumer device is an advertisement that the filter will pass or reject, the control processor being arranged to draw to the attention of the user of the consumer device, in use, the presence of an allowable advertisement that has been accepted by the filter.

The network may also include a remote advertisement broker or advertisement reply device contactable via the long range emitter of the consumer device, and capable of contacting the advertiser device by the long range receiver of the advertiser device.

It will be appreciated that whilst it is envisaged that "advertisement" will usually be something offered for monetary recompense, it may not always be so. For example, it is possible that the advertisement may comprise a circulation of the titles or abstracts of recently published papers or internal news, and the "reply to advertisement" may be a request for the full copy of the documents, with or without payment; the advertisement may comprise a request for volunteers to perform a task, and the reply may be volunteers agreeing to perform the task and enquiring more about what is expected of them.

The invention may be seen as a way of telecommunication devices acquiring information.

According to another aspect the invention comprises a method of creating an advertisement on a telecommunications device, the method comprising having the device submit a free form advertisement to an advertisement writer tool and having the tool assess the advertisement and allocate to it at least one selected advertisement subset of a set of allowable advertisement characterisation categories, and the advertisement writer tool communicating the selected advertisement subset, or subsets, of allowable advertisement categories to the telecommunications device.

The method preferably comprises communication between the device and the advertisement writer tool via long range telecommunications, preferably a cellular telephone network.

The advertisement may comprise just text, or text and images, or text and sound, or text, sound and images. Indeed, text messages may not be necessary in the advertisement; it could be just image and/or sound.

The pre-defined set of advertisement categories may be sent to the telecommunications device for reduction there to a filter sub-set, or the reduction to the filter subset many take place on the advertisement writer tool device.

According to another aspect the invention comprises a method of creating an advertisement filter on a telecommunications device, the method comprising connecting the device to a remote filter—creating device via telecommunications; creating a subset of allowable advertisement categories by selecting, via the telecommunications device, the subset from a master set of possible advertisement categories held on the filter creating device; transmitting the subset of allowable categories to the telecommunications device to create the filter on the telecommunications device, and storing the filter on the telecommunications device.

The allowable categories may include "not category X": the deselection of advertisements with a particular category associated with them, as well as, of course, the positive selection of advertisements which have a category that matches those of the filter.

The service provider, or advertisement writer/filter creator tool may comprise the same device which may have a common allowable list of categories and standard keywords (common to both advertisement-creating and filter creating). An advertiser can use this standardisation to create their advertisement (which may have a separate keyword/categorisation profile associated with it, or which may have its categorisation profile determined by the words in its text). A consumer may select from the list of allowable keywords those that they will have on their filter. The filter may have geographical restriction in it, and/or a time restriction.

The advertisement services may comprise auction services, the auction services may comprise offering something for a predetermined time and then selling to the highest bidder, or buying from the lowest bidder, at the expiry of the bidding term.

According to another aspect the invention comprises software encoded on a data carrier which when loaded into a control processor of a telecommunications device and running on the device causes the device to be a telecommunications device in accordance with any preceding aspect of the invention, or causes the device to take part in or perform any method aspect of the invention previously recited.

According to another aspect the invention comprises a mobile telecommunications device programmed with the software of the preceding aspect of the invention.

According to another aspect the invention comprises software encoded on a data carrier which when operational on a server causes the server to be a server in accordance with any preceding server aspect of the invention, or to perform a method, or take part in a method, according to any preceding aspect of the invention.

According to another aspect the invention comprises transmitting a subset of data records of a larger data record set from a remote device to a user device using telecommunications comprising transmitting to the user device limited details of the data record, selecting at the user device which data records are of interest, requesting further details or the full data record of selected data records from the remote device, and transmitting to the user device via telecommunications the further details or full data records selected.

The data record may, of course, comprise an advertisement.

It will be appreciated that many features of an aspect of an invention will also be applicable to many, or all, other aspects of the invention. It is to be understood that unless explicitly stated any feature of any aspect of the invention can be used with all aspects of the invention.

Embodiments of the invention will now be described by way of example only, with reference to the accompanying drawings, of which FIG. 1 shows schematically two mobile telephones in accordance with the invention;

FIG. 2 schematically illustrates the invention;

Figure 8:
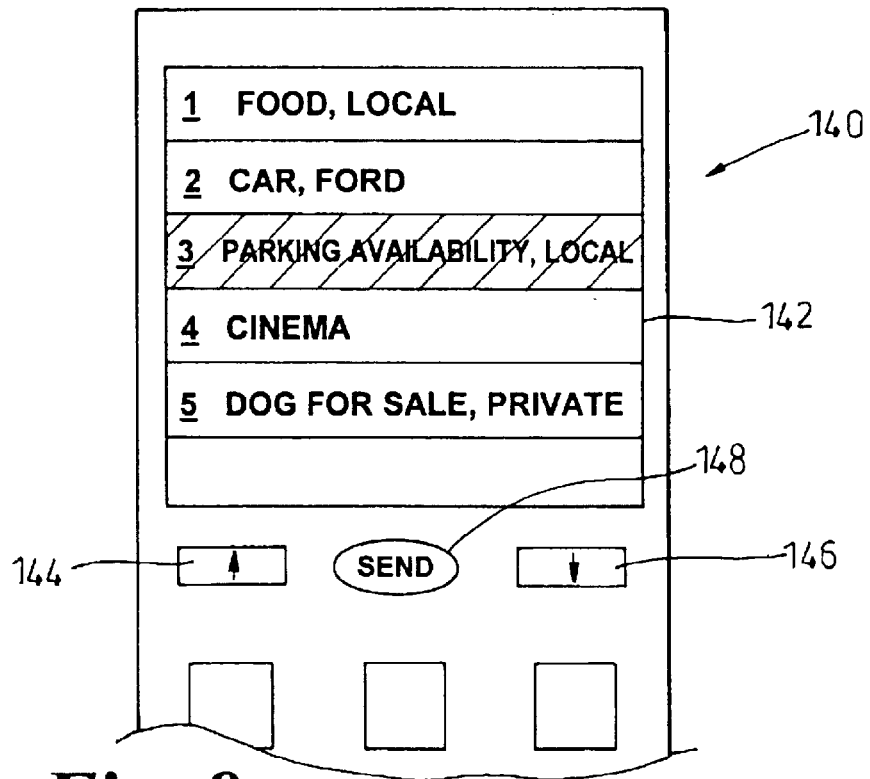
Figure 5:
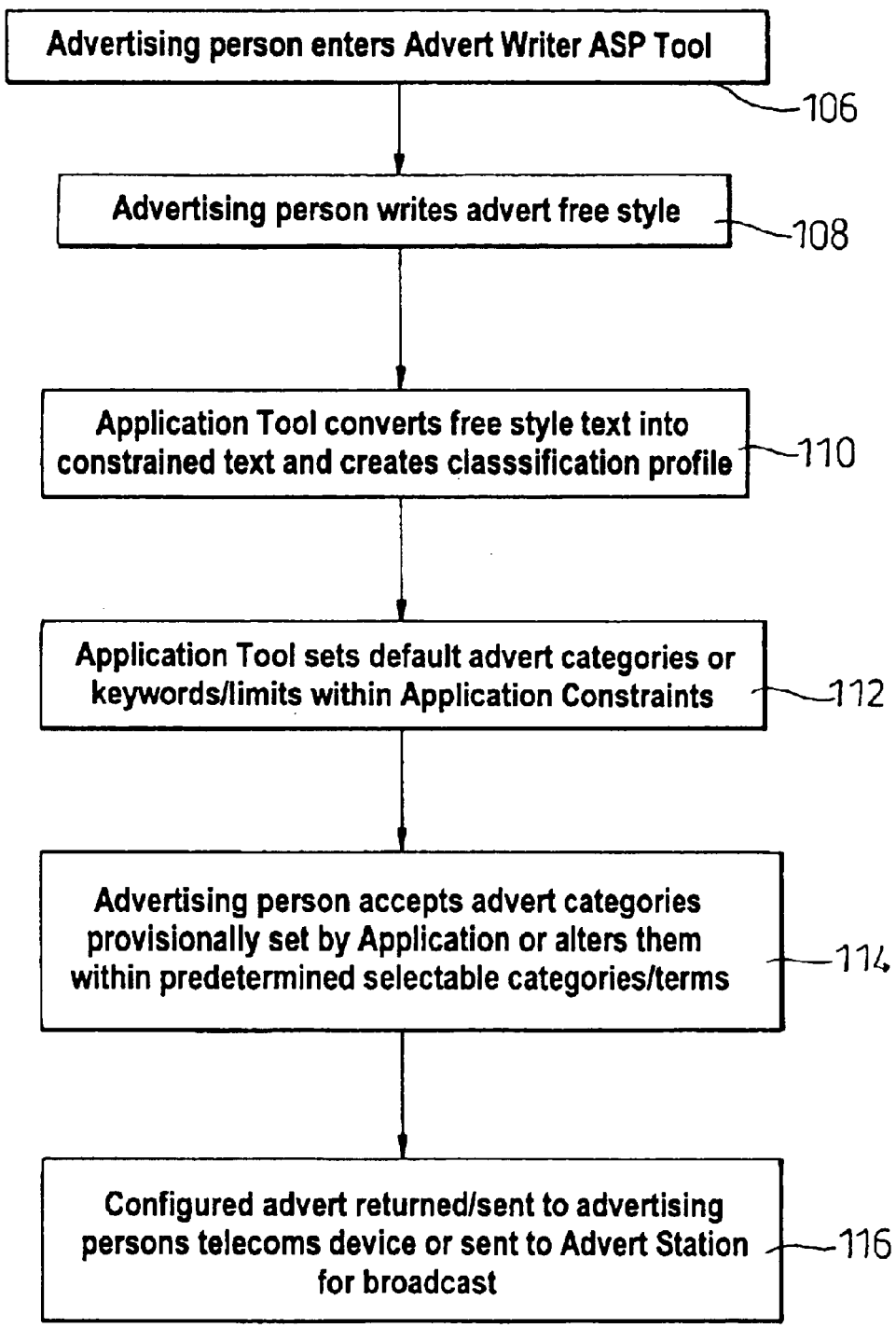
Figure 6:
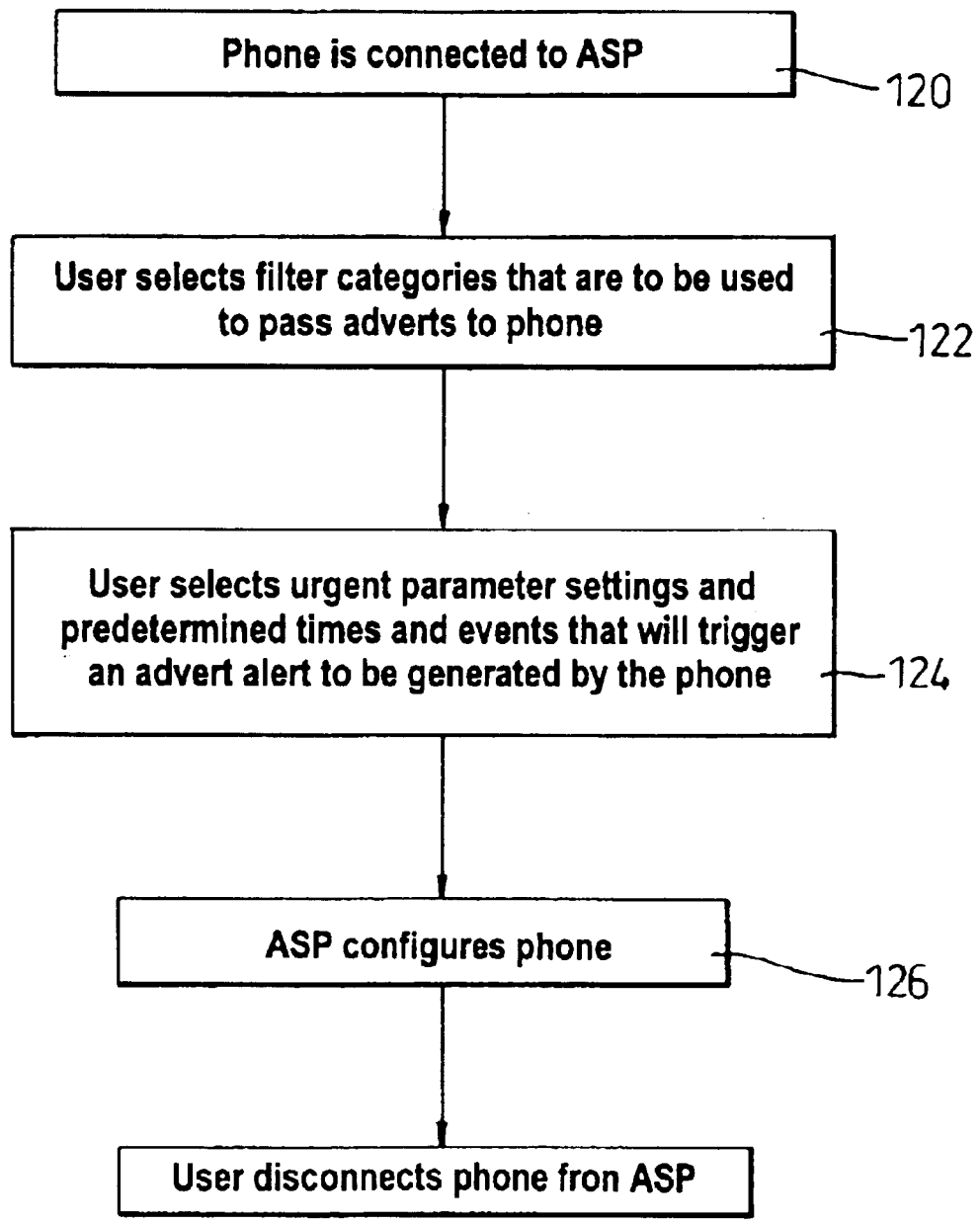
Figures 7, 9:
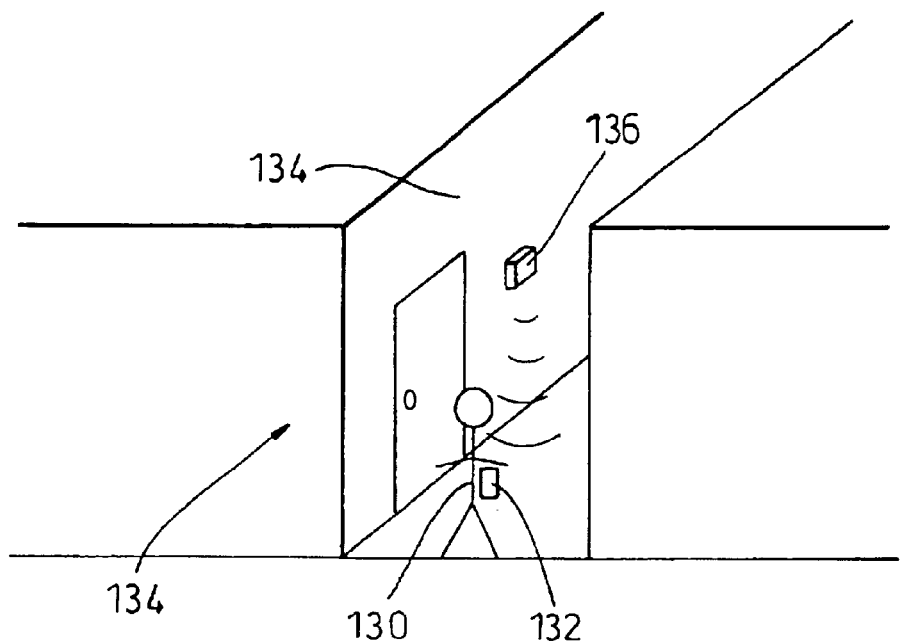

FIG. 5 schematically illustrates one way that an advertising person can create their advertisement;

FIG. 6 schematically illustrates one way that a person can configure their mobile telephone to screen out unwanted advertisements;

FIG. 7 schematically shows a building with a point of high human traffic flow provided with an advertising station;

FIG. 8 shows the visual display of a mobile telephone with some advertisements accepted on it; and FIG. 9 schematically shows an advertisement.

Figure 1:
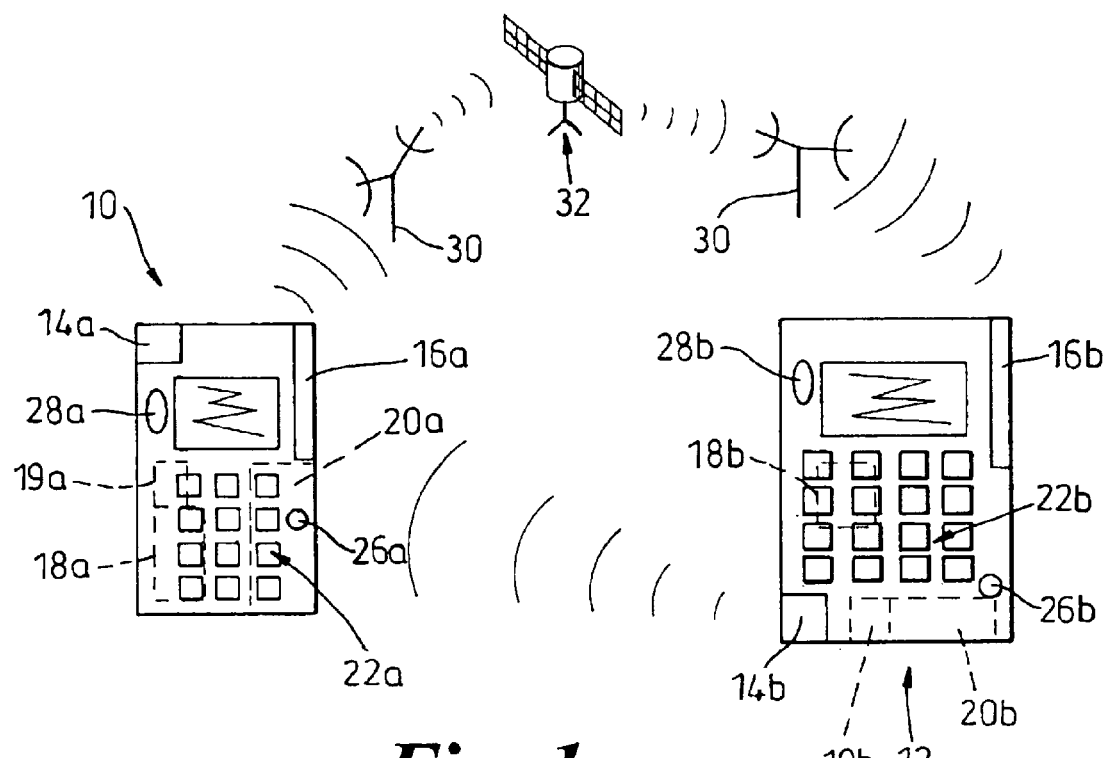

FIG. 1 shows a first mobile telephone 10, a consumer's telephone, and a second mobile telephone 12, an advertiser's telephone. Both telephones have both short-range (of the order of 10 meters or so) wideband wireless telecommunications capabilities, e.g. Bluetooth or IEEE812.11, provided by short range telecommunication antenna 14a and 14b, and they both also have long range cellular telecommunications capabilities provided by long range antenna 16a and 16b.

Both telephones also have a control processor 18a or 18b, memory data storage 19a and 19b, a battery 20a or 20b, a keypad or other data input means (e.g. voice recognition) 22a or 22b, a display screen 24a or 24b, a microphone 26a or 26b, and a speaker 28a or 28b.

The two telephones 10 and 12 can communicate in a piconet via their short range telecommunication channels when they are close enough together, and can communicate via their long range antenna 16a and 16b, (and via land emitters and receivers 30, and via satellite 32) at much greater distances apart (miles, hundreds of miles, or thousands of miles apart).

Such telephones may be termed "dual mode" or "hybrid" telephones. It will be appreciated that by "telephone" is meant primarily what is conventionally thought of as being a mobile telephone, but also "mobile telecommunications device", such as a Personal Digital Assistant (PDA), laptop or palmtop computers, or even devices which have other functions, possibly even other primary functions, in addition to having short range and long range telecommunications abilities.

Figure 2:
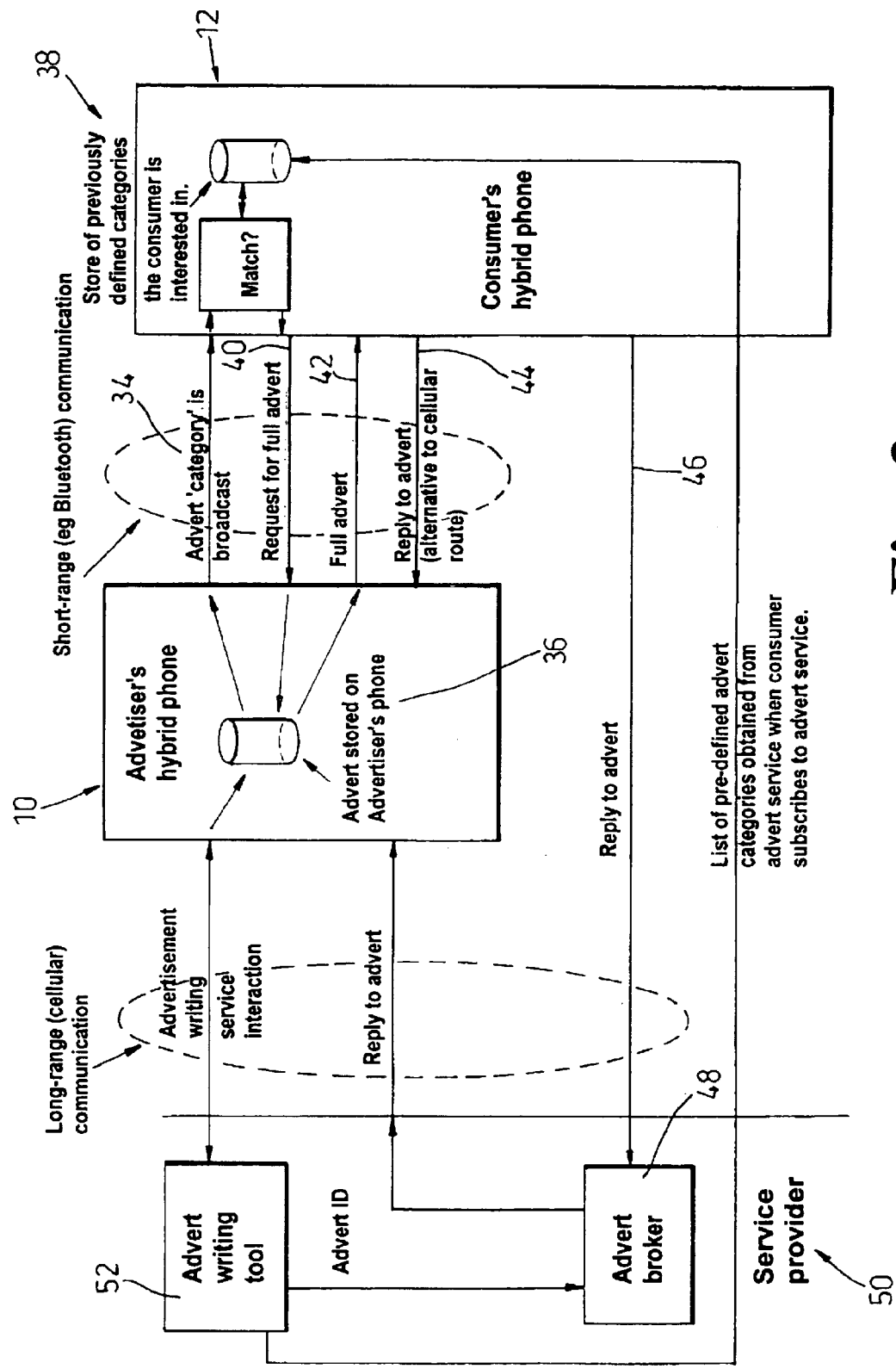

In the example of FIG. 1 and as illustrated in FIG. 2, telephone 10 is the advertiser's telephone and it has within it an electronic advertisement advertising something for sale (for the sake of example). Phone 10 has its controller 18a and memory 19a arranged so that it broadcasts, referred 34 in FIG. 2, periodically, say every 30 seconds, a short-form advertisement, or category of advertisement, using its short range telecommunications antenna 14a. The advertisement is stored in the advertiser telephone memory 19a, as mentioned in FIG. 2 at reference 36, and is recalled to an emitter circuit of the telephone periodically for broadcast.

The consumer's hybrid telephone, 12, has an advertisement filter 38 and when it receives the broadcast advertisement 34 it compares its categories or profile permissible parameters with those of its filter 38, and if there is a match to a suitable degree the consumer's telephone 12 sounds or vibrates, or otherwise alerts the consumer to the presence of an advertisement of interest. In an alternative embodiment it does not notify the consumer at this stage.

After the consumer's telephone 12 has determined that the broadcast advertisement is of interest it automatically sends out a signal via its short range telecommunications antenna 146 requesting a full advertisement from the telephone 10 (referenced 40 in FIG. 2). Upon receipt of the request for the full advertisement, telephone 10 transmits its full advertisement, again via its short range telecommunications (referenced 42). If the advertiser telephone 10 is out of piconet range (which is unlikely since the "full advertisement request" is likely to be issued within a second of receipt of the short-form advertisement), or no piconet transmitted full advertisement is received by the consumer phone 12, it may contact the advertiser via its long range telecomms, if the telecomms address of the advertiser is known.

The consumer's telephone 12 receives the full advertisement and stores it in its memory 19b. At this stage the device 12 notifies the consumer that it has an advertisement of interest (if it has not already done so). Alternatively, the telephone 12 may be configured to alert the consumer only at predetermined times (e.g. the end of the work day, or at lunch time), or at predetermined location (eg. at a consumer's home, at their office, or perhaps anywhere else but not whilst they are at certain locations (e.g. not in their car when they might be driving, and not in a main meeting room, not in a cinema etc.)

After the consumer has experienced the advertisement (it could be audio, visual, or both) they may wish to reply to the advertisement. They can do this by triggering an automatic reply dial. The advertisement category, short-form advertisement, that has already been received by the consumer's telephone 12, provided the telephone 12 with the telecommunications address of either the full advertisement, the reply address for the advertisement, or both. Alternatively the reply address may be communicated to the phone 12 by the full advertisement 42. However, the phone 12 becomes aware of the reply address, it sends a reply, referenced 44 and/or 4b in FIG. 2.

The phone 12 initially tries to reply to device 10 via the short range telecomms 14a and 14b. If that is successful then the two phones 10 and 12 can continue to communicate over, for example, Bluetooth, or the like.

If no reply connection can be established over the local piconet, the device 12 uses its long range cellular telecommunications ability, via antenna 16b, to reply to the advertisement. This is referenced 46 in FIG. 2. In FIG. 2 the reply 46 is addressed to an advertisement broker 48 which forwards the reply to the advertiser's telephone 10, possibly after removing data that would enable the device 10 to contact the device 12 directly, e.g. the address of device 10. It may be desirable to do this if the advertiser who is using phone 10 has to pay the advertisement broker to be put in direct contact with the interested customer.

The amount of data, and the content of the data, in the reply 44 or 46 may be constrained by the advertising service provider referenced 50.

When the advertiser agrees to pay the advertisement broker (if this is necessary) the advertisement broker provides the direct telecomms address of the consumer to the advertiser, or of the advertiser to the consumer, or both of their addresses to each other. It will be appreciated that the arrangement may be that the interested consumer may pay/agree to pay instead of or as well as the advertiser before they are put properly directly in touch with each other.

FIG. 2 also indicates that the service provider 50 makes available to the advertiser, via their telephone 10, an advertisement writing tool 52. This is used to ensure conformity and standardisation of short-form advertisements 34, or at least of their searchable/filterable categories, so that the filter 38 of the consumer's telephone can find those advertisements that are classed as being in the sought categories and screen out other advertisements.

Figure 3:
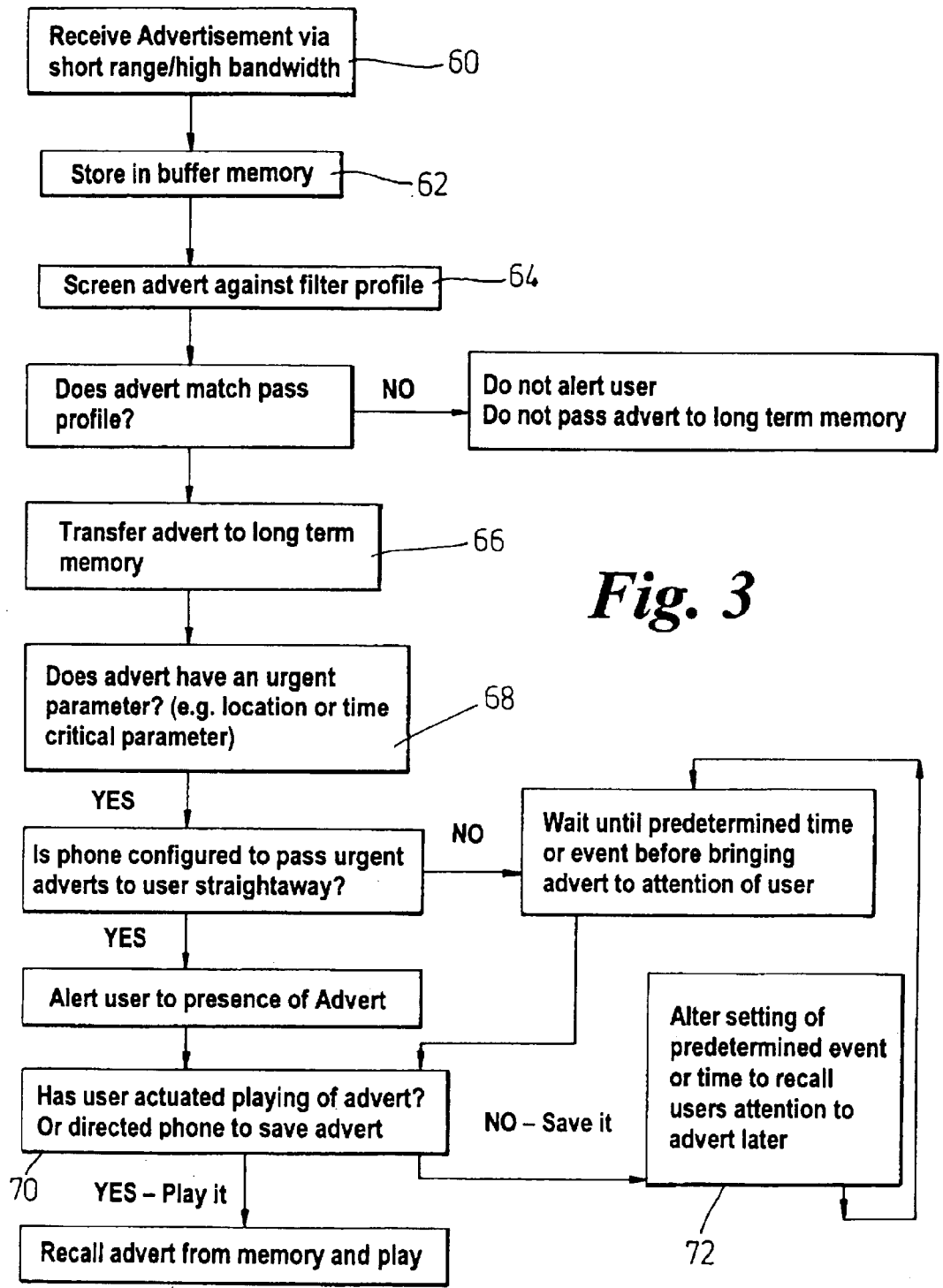
FIG. 3 is a flow diagram illustrating one way of implementing an aspect of the invention.

FIG. 3 shows a flow chart process for another embodiment of the invention. In this example the consumer's telephone 12 receives at 60 an advertisement via its short range/high bandwidth telecomms system. The advertisement, which may simply be the classification categories into which the advertisement falls, or may also include text, audio, or video, is stored in buffer memory temporarily, step 62.

The advertisement is screened, at step 64, against the pre-existing filter profile in the phone 12. If the profile of the advertisement does not match that of the filter to an acceptable degree the consumer is not alerted to the presence of the advertisement, and the advertisement in the buffer memory can be overwritten by future advertisement received by the device 12, or may even be positively deleted. If the advertisement is passed by the filter it is transferred to longer term memory of the phone 12, see step 66.

This embodiment has the feature of being able to alert a consumer of an advertisement very promptly, if appropriate to do so. This may be important if the advertisement has short range (geographical range) applicability, for example a "30% reduction in set meal cost today only" advertisement broadcast by a restaurant, or "upload newspaper now—$1" broadcast by an electronic news-stand. These are situations where the offer is either of immediate interest to the consumer or not, and there is little point in the consumer discovering some hours later that they could have had a special lunch deal hours ago, but have missed it now.

As illustrated at 68 in FIG. 3, one of the advertisement parameters is "urgency", whether that be time expiry of relevancy of advertisement, or physical location—expiry of relevance of advertisement. The phone 10 may be configured to alert a user straight-away if an advertisement in a non-screened out category is received which has an urgency flag associated with it.

The user can decide whether to play the advertisement now, or save it until later, referenced 70. If the user decides to ignore the advertisement for now they can decide not to play it, and their phone 10 saves it with an automatic recall function 72 where the advertisement is re-presented on the phone to the user for playing at either a predetermined time later (e.g. 2 hours later, provided replay time is between 8.00 am and 10.00 pm), or a set event (e.g. 5 minutes after detecting the user's home base beacon at their house, or at their office, or in their car).

Figure 4:
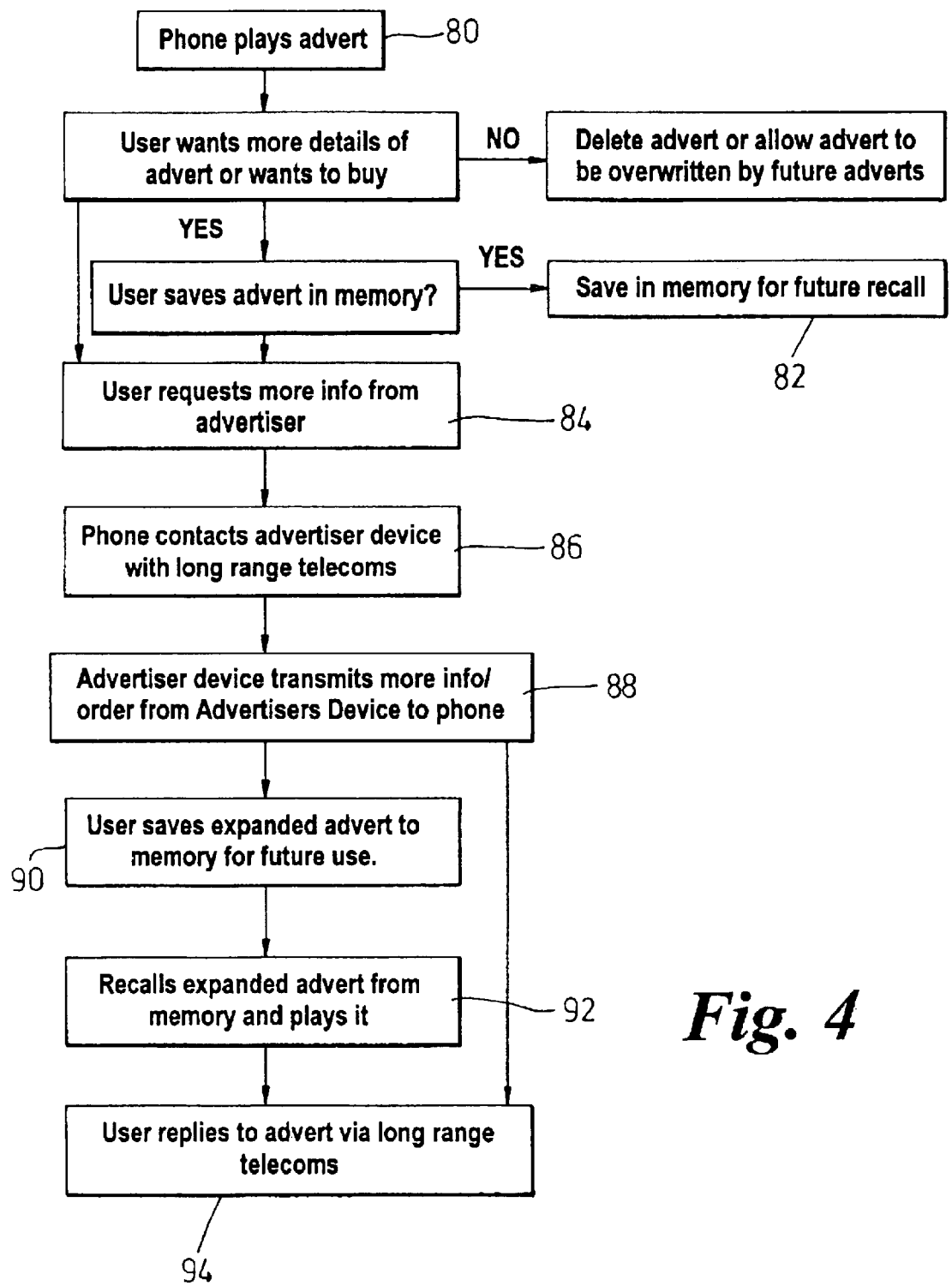
FIG. 4 is a flow diagram illustrating one way of implementing the playback of a captured advertisement.

FIG. 4 illustrates the configuration of one embodiment of the invention, after a consumer has decided to play the advertisement (reference 80). The user may decide to save an advertisement they had played back to them to memory (step 82) or they may leave the advertisement in temporary memory and deal with it/enquire further with the advertisement temporarily stored. Either way, there comes a time when the user would like to reply to the advertisement, or to request more details, step 84. The phone 12 contacts an advertiser device via its long distance telecomms, step 86. This advertiser device could be another mobile device, or the device which transmitted the advertisement (which very well may be a mobile device) or it could be a separate, different, device, e.g. an Application Service Provider Server.

The advertiser device transmits more information to the consumer device 10 via the long distance, e.g. cellular, network. The device 10 saves the expanded advertisement, with the extra information to memory, step 90 (possibly temporary memory, or possibly long term memory). The user can reply to the advertisement via long range telecomms 94.

FIG. 5 shows one possible implementation of how an advertiser may create an advertisement on their advertising device. There is an Application Service Provider (ASP) who can be contacted by the advertising device via long range telecomms (e.g. internet or cellular, referenced 106). The advertising person types in their advertisement using free text, step 108, typically via their mobile telephone or PDA. The ASP has an ASP Advertisement Writer Tool which takes the free text advertisement and, using a set of algorithms and rules, coverts it into a constrained format, step 110, where only selected predetermined words can be used in the advertisement, and creates an advertisement classification profile which accompanies the constrained text. The constrained text advertisement and the automatically generated advertisement category profile are presented to the advertiser for review, step 112, possibly along with selected other categories that the user may care to add to the automatically generated categories, or exchange for them. The user may be able to delete or change the automatically generated categories: see step 114. The completed advertisement is then transmitted to an advertising station, see step 116. This advertising station may be the advertiser's device (e.g. phone), or it could be a separate advertiser station, e.g. a site where a lot of people pass by.

FIG. 6 shows the setting of an advertisement filter for a mobile phone. The telephone 12 (consumer) telephones the ASP, step 120, and the consumer is presented with a display of possible filter categories, for example: holidays, sport, cars, under $100, under $50, $1000–$5000, clothes, male/female, age target, geographical vicinity of advertiser to be within specific distance of consumer phone (GPS/position sensors may be provided, or just short range capabilities may set the allowable geographic spectrum), food, financial, news, music etc.

The user selects, in step 122, which categories are to be excluded and which are to be included. In this example the ASP gives weightings to other non-specifically indicated categories, dependant upon what has been screened positively in and out of the filter profile, and may pass to the consumer non-specifically screened in, or screened out, advertisements that have a high enough weighting/point score. In this example the user is required specifically to select whether to allow urgency flags to trigger an immediate advertisement alert (if the advertisement if the advertisement passes the rest of the filter) or not, step 124.

When the user has set their filter profile on the ASP it is downloaded from the ASP to the phone, step 126, and the user disconnects from the ASP.

FIG. 7 shows one possibility. A user 130 and their mobile phone 132 are in a shopping mall 134 and as they pass a bookstore 134 an advertiser device 136 broadcasts an advertisement on a short range wideband emitter to the mobile phone 132. The advertisement offers a special deal on certain books, e.g. the top 10 best sellers, if the books are bought in the next few hours or days.

The advertiser device 136 (or a similar device associated with another organisation, not necessarily the example given) may emit electronic vouchers or coupons, redeemable against certain goods or services, possibly with a time expiry date.

It will be appreciated that a static advertiser device can reach a lot of people if it is in a busy place such as a shopping mall, turnstile or doorway of a building, or a transport station, such as a train or subway station. A mobile advertiser station, e.g. in a train or taxi, or even carried by a person (e.g. their mobile phone) may be in piconet contact with a great many other devices over a period of time.

Some advertisers may pay some people or organisations to carry their advertisements. For example a company may agree to contribute to a mobile telephone bill if the mobile telephone carries their advertisement and broadcasts it. An amount per enquiry originating from their telephone, or a "rental" fee payable to the owner of the device may be envisaged.

The advertisement could be on offer to sell or supply, or a request to buy or receive.

It will also be appreciated that it may be preferred in some situations to ensure that the reply to an advertisement is transmitted via long range telecommunications, or at least not let the advertiser know that the reply has come via short range telecomms. It can be awkward for a potential customer if a seller/advertiser knows that there is such a potential customer (i.e. someone whose telecomms device has replied to their advertisement) within a few meters of them—in a piconet with them.

The advertisement may take the form of an auction, or reverse auction. An item may be open for bids for a fixed time period and then sold to the highest bidder (or in the reverse auction scenario, the lowest bidder).

A benefit of using a wideband link for the short-form advertisement is that it makes the transmission time of a short form advertisement short, for example less than one second is envisaged. The transmission of the full advertisement and associated details, over Bluetooth or other short range telecomms, might be of the order of a few seconds. The data rate envisaged for the short range telecomms is of the order of 500 kbits/second or better. Perhaps ten times that, or better can be achieved. Video clips may be transmitted.

The short range wideband link may have a data rate that is perhaps 10 to 1000 times as great as that of the long distance telecomms link. In an alternative embodiment the data rates may vary by a factor of <2, 2, 5, 10, 50, 100, 500, 1000, or more, or by an amount defined by a range between any of those values.

Although primarily described in relation to advertisements, the invention is potentially applicable to other situations where a first tranche of data is provided to a user who may or may not want a further tranche of data, for example abstracts of documents may be distributed via short range piconet links, with users able to obtain fuller text via long range telecomms (and there may or may not be a cost payable to the host/ASP/database for the fuller text).

The fact that the piconet advertisements are necessarily originating from a local source may be attractive. The invention may be thought of as the broadcasting and filtering of local advertisements over a piconet, with the probable provision of a writing tool (e.g. WAP based) and the possible provision of a broker for responses to advertisements that come back via the cellular network or piconet.

FIG. 8 shows a mobile telephone 140 having an LCD display 142. There are five advertisements currently in the memory of the phone 140, and being displayed on display 142. These advertisements are short-form, category-only advertisements. The phone 142 is still in piconet contact with the advertiser device(s) that is/are transmitting the short-form advertisements. The user selects which advertisement to enquire about by using the up/down controls 144, 146 and, in this example chooses advertisement number 3, Parking Availability. Local. In this example those advertisements which carry a "local" flag/characteristic have "local" next to them on the display 142 so that the user can tell they are local.

The user presses the "send" button 148 (or "yes" button) when advertisement 3 is selected and the phone 140 transmits a piconet signal broadcast generally. The piconet advertiser device that is advertising parking space then sends back details of where the parking space is, and how much it costs. In this example the advertiser device does not make a charge for fleshing out the short-form advertisement. The user can now drive to the car parking space knowing that it is close. Whilst each piconet device has a range of the order of a few meters to tens of meters, a piconet in a city, for example, could extend hundreds of meters due to piconet devices passing on messages to other piconet devices in the piconet. Thus the car parking space can be much further away from the phone 140, even if the advertising device is in the car park (which it need not be).

Item 5 on the display 142 illustrates another characteristic label that may be displayed with the short form advertisement: whether the advertisement is from a commercial organisation or a private individual (i.e. word "PRIVATE" indicates private individual's advertisement).

FIG. 9 shows an advertisement 150 having text 152 to be displayed on the screen of a consumer's telephone, and classification codes 154 that are not displayed, but that are used by the advertisement filter of the consumer's phone to determine whether the consumer wishes to know about the advertisement. It has both "SELL" and "BUY" codes since the advertiser is both looking to part with a dog and to acquire toys.

The phone 140 presents the advertisement categories 1 to 5 initially as text only. The list of advertisements on its display may be a limited number of advertisements, limited to the best matches to the filter. The list may be a rolling list which is scrollable through advertisements received, either manually scrollable or automatically scrolling. The phone may have no filter.

To return to an overview of embodiments of the invention: It will be apparent that the advertisement of short range high bandwidth wireless technologies such as Bluetooth will give rise to a new class of hybrid mobile phones that combine both a long range cellular link with a separate short range wireless link in the same device. With such hybrid phones, it will be possible to communicate via the cellular link, passing information received directly on through the short range link to nearby devices, and vice-versa. The present invention takes advantage of this to provide an advertisement service that uses these hybrid phones to broadcast advertisements, receive advertisements and respond to these advertisements.

The advertiser preferably broadcasts only a minimal advertisement to those in the vicinity, typically the advertisement category. If there is a match of interest in the consumer's phone, the consumer's phone then requests the full advertisement details which are quickly transferred over the short range link. This "advertisement transaction" will happen very quickly, and because of the short range communication that is used, by the time the consumer has had time to consider the advertisement the advertiser may be out of range. Thus, there is proposed a response route via the long range cellular network. The consumer indicates on his phone his desire to purchase the item, and signals this back via the cellular network. The advertisement broker matches the ID of the advertisement with that of the advertiser and passes on a message to the advertiser informing him of the consumer's interest.

The wireless nature of the short and long range telecomms envisaged is attractive.

The service provider, or advertising device could provide an auction, or other value-added services.

Each mobile phone or PDA could be viewed as a walking billboard. It is of course possible to configure a phone to respond to accept no advertisements.

It will be appreciated that in the prior art a user who wants to have details of a lot of documents/data (e.g. advertisements) from a remote site has been able to transmit the database to themselves and to discard what they do not want. This is very wasteful in telecommunication capacity and requires a great deal of bandwidth, and also a lot of memory at the receiving device. The present invention reduces the amount of data that is carried via telecommunications, and that is stored (albeit temporarily), in comparison with transferring everything and then discarding at the user's end.

An alternative known system is for a user to type in a search strategy to a computer to instruct a remote database host to perform a search for the data of interest and to transmit to the user via telecommunications just the result of the database search. However, this does not lend itself very well to the situation such as advertising where a user does not know that there is data that they might like to see (because they would not know to type in an appropriate search command). Some embodiments of the present invention positively, and proactively, draws to the attention of a user opportunities to discover more about a data record.

Some embodiments of the invention transmit relatively large volumes of data over high bandwidth, cheap (or even free-to-air) short range wireless transmissions. This avoids congesting land lines, or long range cellular networks. These embodiments may restrict the use of the long range wireless telecommunications, which typically are more expensive in transmission costs and are often more congested, to smaller volumes of data, and/or to data that is known to be of interest (rather than speculative unsolicited data). This can improve the overall availability of the long distance e.g. cellular network, the connection rate for successful connections, and can reduce the rate for connections being unexpectedly terminated.

By having the advertisement writer and filter creator at a remote site, the mobile consumer and advertiser devices can potentially have simpler microprocessors/software stored on them, and require less processing power and memory than they otherwise would, since the software and databases used to create the advertisements and filters need not be stored in them, or be operable in their processor chips.

By having advertisements, or other data, broadcast at low power over a short range piconet by an advertiser device (e.g. mobile telephone), it is possible to avoid using high power, longer distance, transmitters, and the power density of radiation in the environment may be kept down (in comparison with having a big long range transmitter). This may help reduce electromagnetic "pollution" of the electromagnetic environment, and may reduce the likelihood of signals interfering with other things undesirably.

What is claimed is:

1. A method of advertising to a consumer device comprising:
   broadcasting a short range piconet advertisement;
   making an assessment as to whether a response or reply to the advertisement is required and, if so, replying to the advertisement via telecommunications;
   sending a first part of the advertisement via the short range telecommunications; and
   sending a second, longer or larger, part of the advertisement via short range telecommunications, the second part of the advertisement being transmitted after the consumer device has screened the first part of the advertisement and has requested the second part of the advertisement.

2. A method according to claim 1 comprising requesting further or fuller details of the advertisement via long range wireless telecommunication.

3. A method according to claim 1 comprising replying to the advertisement via short range piconet wireless telecommunications.

4. A method according to claim 1 comprising broadcasting a short form advertisement and requesting further or fuller details of the advertisement.

5. A method according to claim 4, in which the request for further or fuller details is made via short range telecommunications and, upon failing to make contact with an advertising device, trying to make contact with the advertising device via long range telecommunications.

6. A method according to claim 1 in which the advertisement is broadcast by a hand-portable mobile wireless telecommunications device.

7. A method according to claim 1 in which the advertisement is assessed using a consumer hand-portable mobile wireless telecommunications device.

8. A method according to claim 1 in which receipt of the short form advertisement prompts the consumer device to request more information via the short range telecommunications automatically if the short form advertisement triggers a trigger to do so.

9. A method according to claim 1 comprising:
using short range telecommunications to communicate:
(a) a short-form advertisement to the consumer device,
(b) a request for a fuller advertisement from the consumer device to an advertiser device, and short range telecommunications to communicate fuller details from the advertiser device to the consumer device, all taking place within the order of a second or a few seconds; and
using long range telecommunications to carry a reply to the advertisement to an advertisement reply device which is a device different from that from which the advertisement was broadcast.

10. A method according to claim 1 comprising storing the telecommunications address with which the consumer device is to communicate the reply to the advertisement in the consumer device far display, for automatic dial or for semi-automatic dialing, or both.

11. A method according to claim 1 in which the advertisement is received by a portable telephone, personal digital assistant or other hand-held portable electronic device, and in which the assessment as to whether a replay to the advertisement is required is at least in part made by the portable consumer device.

12. A method according to claim 11 in which the advertisement received by the mobile device is screened against an advertisement profile filter by the device before being presented to the user of the device, and is only presented to the user if the advertisement passes the screening operation.

13. A method according to claim 1 comprising:
broadcasting a short range advertisement from an advertiser telecommunications device;
receiving the broadcast advertisement on the consumer telecommunications device; and
replying to the advertisement via a broker device interposed in the telecommunications link between the advertiser device and the consumer device.

14. A method according to claim 13 in which the broker device modifies at least one of (a) the message sent by the consumer device to the advertiser device, and (b) modifies any follow-up message sent to the consumer device by the advertiser device, or a proxy or master advertising device.

15. A method according to claim 13, in which the advertiser device does not include its own telecommunications address in its broadcast advertisement, but does include the telecommunications address of the broker device.

16. A method according to claim 1 in which the advertisement includes one or more advertisement classification codes which are compared with allowable advertisement codes in an advertisement screening operation by the consumer device.

17. A method according to claim 16 in which the consumer device stores or brings to the attention of a user only those advertisements which are passed by the screening operation that it performs on the broadcast advertisements that it receives.

18. A method according to claim 1 in which the consumer device is used to reply to an advertisement via long range telecommunications.

19. A method according to claim 1 in which the second part of the advertisement is broadcast by the same advertiser device that broadcast the first part.

20. A method according to claim 1 in which the advertisement is broadcast from a hand-held portable, pocketable wireless advertiser device.

21. A method according to claim 1 comprising using portable electronic devices for both the advertiser device and the consumer device, both devices having piconet short range and long range telecommunication capabilities.

22. The network of claim 1 wherein the telecommunications device comprises a mobile telephone.

23. A method of advertising to a consumer device comprising:
broadcasting a short range piconet advertisement;
making an assessment as to whether a response or reply to the advertisement is required and, if so, replying to the advertisement via telecommunications; and
broadcasting a short form advertisement and requesting further or fuller details of the advertisement, the request for further or fuller details being made via short range telecommunications and, upon failing to make contact with an advertising device, trying to make contact with the advertising device via long range telecommunications.

* * * * *